United States Patent Office 3,332,885
Patented July 25, 1967

3,332,885
CATALYST COMPOSITION FOR OXYCHLORINATION OF HYDROCARBONS
Riichiro Imoto, Yujiro Kosaka, and Masaaki Hayata, Tsuno-gun, Yamaguchi-ken, Japan, assignors to Toyo Soda Mfg. Co., Ltd., Yamaguchi-ken, Japan
No Drawing. Filed Dec. 2, 1963, Ser. No. 327,548
Claims priority, application Japan, Mar. 15, 1963, 38/14,331
2 Claims. (Cl. 252—440)

The present invention relates to novel, highly effective catalyst compositions suitable for use in carrying out the reaction of oxychlorinating hydrocarbon by means of hydrogen chloride and oxygen.

The oxychlorination of hydrocarbon herein referred to means chlorination reaction of hydrocarbon via hydrogen chloride and oxygen in which hydrocarbon is chlorinated by chlorine produced by oxidation of hydrogen chloride.

Thus, in the oxychlorination of ethylene into 1,2-dichloroethane, for instance, the reaction concerned may be demonstrated by the following equations:

$$4HCl + O_2 = 2H_2O + 2Cl_2 \quad (1)$$
$$2C_2H_4 + 2Cl_2 = 2C_2H_4Cl_2 \quad (2)$$
$$(+)\ \overline{\phantom{xxxxxxxxxxxxxxxxxxxxxxxxxxxxxxxxxxxxxxx}}$$
$$2C_2H_4 + 4HCl + O_2 = 2C_2H_4Cl_2 + 2H_2O \quad (3)$$

In the case of substitution reaction, on the other hand, vinyl chloride is produced as shown by the following set of equations:

$$4HCl + O_2 = 2H_2O + 2Cl_2 \quad (1)$$
$$2C_2H_4 + 2Cl_2 = 2C_2H_3Cl - 2HCl \quad (4)$$
$$(+)\ \overline{\phantom{xxxxxxxxxxxxxxxxxxxxxxxxxxxxxxxxxxxxxxx}}$$
$$2C_2H_4 + 2HCl + O_2 = 2C_2H_3Cl + 2H_2O \quad (5)$$

The rate-determining step in the reaction process in oxychlorination of hydrocarbon is the oxidation of hydrogen chloride of Equation 1 known as Deacon reaction. For promoting this reaction, there have been proposed many kinds of materials to be used as catalyst, among which chlorides or oxychlorides of copper, iron, chromium, etc., are regarded as particularly effective.

Actually, however, since the catalytic activity of these metal chlorides is not sufficiently great, it is necessary to carry out the reaction in a temperature range of 300–600 degrees C. The application of such a high temperature range involves a drawback in that it renders these chlorides to become a volatile inducing a rapid decline in the activity of the catalyst. It also gives rise to a serious problem of corrosion of the apparatus.

In order to overcome these weak points, there have been proposed several mehods such as the use of metal chlorides in admixture with an alkali metal chloride, for example, potassium chloride as promoter or the use of a catalyst system to which chloride of a rare earth element is further added, or converting the volatilized portion of catalyst coming out in company with reaction product of the reactor into aqueous hydrochloric acid and bringing the aqueous solution back to the reaction system.

So far as the known types of catalysts are concerned, however, none of the measures proposed have proved to be effective enough in suppressing the volatilization of catalyst or lowering the reaction temperature in any marked extent.

The present invention is concerned with novel types of catalyst compositions which can be put to use with high efficiency even at low temperatures.

The catalyst compositions of this invention consist of multiple salt or a mixed multiple salt supported on a carrier, and are prepared by depositing any one, two or three components of sodium bisulfate, potassium bisulfate and ammonium bisulfate along with copper chloride to be supported by an inert carrier like silica gel by usual absorption and precipitation methods.

The catalyst composition is also prepared by addition to the above-mentioned catalyst composition any one of thorium chloride, lanthanum chloride, or cerium chloride or a mixture of two or three members of these chlorides.

The above-mentioned bisulfate-metal chloride multiple salts constitute eutectics which melt at rather low temperatures. In particular, the triple salt obtained by adding copper (II) chloride to an equimolar mixture of sodium bisulfate and ammonium bisulfate shows a melting point of about 100° C., above which the triple salt behaves as a stable melt. When copper (II) chloride is added in excess, there is produced a fused, mixed multiple salt in which eutectics or excess of copper (II) chloride are suspended.

Addition of one, two or three members of thorium chloride, cerium chloride and lanthanum chloride to the above-mentioned triple salt or mixture thereof causes neither of them to change their state at temperatures higher than the eutectic point.

The particular catalyst of this invention having high efficiency may be obtained in the composition range in which a multiple salt as a homogenous mass of eutectic is made up with the above-mentioned catalyst components as well as in the composition range in which either a partial or complete separation of eutectic takes place.

As regards the use as catalyst of metal chlorides in the Deacon reaction as well as in the oxychlorination reaction, it is known that the highest activity is obtained when the catalyst is in a state of molten mass. In the case of using the known catalyst systems, which consist essentially of the combination of an alkali metal chloride and either cupric chloride or ferric chloride, however, it is impossible to obtain an appreciable lowering in melting point.

The equilibrium constant of the oxidation of hydrogen chloride shown by Equation 1 enlarges as temperature decrease and the equilibrium moves towards the products side with decrease in temperature. With the known types of catalyst, however, the reaction has to be carried out in a temperature range as high as 300–600° C. in order to have an effective reaction velocity, because the catalyst activity decreases at lower temperature.

The catalyst system of the present invention may be used effectively in a low temperature range of 150–350° C., and it shows particularly high activity even at such lower temperatures as 150–200° C. as shown in the examples to be given later.

The catalyst system of the present invention may be used in the form of a melt held within pores of carrier at the reaction temperature employed.

The catalyst of the present invention has the folowing advantages.

(1) No amount of catalyst escapes through volatilization.

(2) Corrosion of apparatus may practically be suppressed.

(3) Reaction temperature may be controlled easily.

(4) The catalyst held within pores of carrier being in molten state, the reaction gases are always in contact with with fresh surface of the catalyst and also diffuse deeply with high velocity into layers of the catalyst.

(5) The catalyst, being in the form of a melt, may remain practically free from the poisoning effect of deposited carbonized matters.

(6) The absence of the danger of carbonization or combustion of hydrocarbon results in an increase of utilization rate of the hydrocarbon.

(7) The reaction using the catalyst of this invention affords a high catalytic selectivity for the components to be produced.

About the molar ratio of bisulfate to copper (II) chloride, which is herein represented as R=total number of moles of bisulfates/total number of moles of metal chlorides, reference may be made to the following: The optimum activity of catalyst is obtainable in the range of $R=0.1–10.0$, particularly in that of $R=1.4–2.0$ or so. In employing an R smaller than 0.1, there will take place some volatilization of copper (II) chloride and also some decrease in the rate of reaction. Although adoption of the larger R makes it possible not only to obtain a catalyst having the lower melting point but also to suppress the volatility of copper (II) chloride to much larger degree, an excessive enlargement of R results in a decrease in copper content in the catalyst, thereby diminishes the rate of reaction.

Now, it is well known that in the oxychlorination process the portion of unreacted hydrogen chloride left is generally difficult to recirculate to the reactor, since it can be obtained only in dissolved state in the water produced in the reaction process.

Accordingly, it is necessary in practice to conduct the reaction operation in such a way as to have the unreacted portion of ethylene and oxygen only on the recirculation process by raising the conversion of hydrochloric acid per pass as high as it is possible, preferably approximate to 100%.

In order to fulfill such requirements and to make the apparatus compact, it is necessary that the catalyst composition should not only be stable enough under operating condition, but also be of such high activity that the operation can be carried out with high space velocity.

The present inventors, therefore, conducted a number of experiments to determine the relative catalyst activities of several members of the above-mentioned type of bisulfate-cupric chloride multiple salt and some other catalyst systems prepared by adding said type of multiple salt further with chlorides of various elements, with those of lanthanum, cenium, neodymium, europium, yttrium scandium, actinium, thorium, uranium, zirconium and palladium, respectively.

The experimental results showed that the addition of any one of the above-mentioned salts to said bisulfate-cupric chloride type of catalyst enhances the activity of the catalyst irrespective of whether the metal component of the added salt belongs to the class of actinide elements, or that of lanthanide ones or does not belong to any of these classes of elements. Among these effective elements, lanthanum, cerium and thorium were found to be especially effective and able to enhance remarkably activity of the catalyst composition which corresponds to a large value of R.

Thus, the catalyst composition to which the chloride of lanthanum or cerium and or thorium is added can enlarge its range of R, and can increase space velocity while maintaining high activity.

The hydrocarbons which are suitable in the oxychlorination which uses the catalyst composition of the present invention may include a series of monoolefinic hydrocarbons such as ethylene, propylene, butylene, and the like.

Besides monoolefinic hydrocarbons, any particular hydrocarbon selected from aliphatic, and aromatic hydrocarbons, which can be had at room temperatures in a gaseous or liquid state, may likewise be oxychlorinated with success by use of the catalyst composition of the present invention.

The advantages of the process in which monoolefinic hydrocarbons at room temperatures in gaseous or liquid state are submitted to oxychlorination in the presence of the catalyst composition of the present invention consist among others in that the process is completely free from the catalyst loss arising from volatilization of copper chloride, the catalyst exerts such a great activity as to make it possible for the process itself to be performed at a low temperature and permit to obtain any particular kind of reaction products which is desired with a high selectivity.

Specific examples illustrating preparation of the catalyst composition and its application in the oxychlorination of monoolefinic hydrocarbons according to the present invention are as follows:

PREPARATION OF CATALYST COMPOSITION

*Example 1*

A method of preparing the catalyst composition in accordance with the present invention is carried out as follows:

$NaHSO_4$, $NH_4HSO_4$ and $CuCl_2$ are dissolved in distilled water of an amount of five times the total weight of these salts, the molar ratio of

$NaHSO_4:NH_4HSO_4:CuCl_2$ being adjusted so as to be 1:1:0.2–20. Dried silica gel granules having a particle size of 20–40 mesh are added to the above-prepared aqueous solution of bisulfates and copper (II) chloride, which is employed in such a quantity as to result in a catalyst composition containing 5.4 g. of $CuCl_2$ per 100 cc. of silica gel. Then the wet catalyst mass is evaporated to dryness on a sand bath and the combined water is removed by keeping it in an oven maintained at 200° C.

*Example 2*

Another method of preparing catalyst composition in accordance with the present invention is carried out as follows:

A solution containing one, two or three members of cerium chloride, lanthanum chloride and thorium chloride as dissolved in distilled water is absorbed by silica gel granules of 20–40 mesh in particle size, and a major portion of water is thereafter evaporated off from the mixture to leave a dry product.

The dry product thus obtained which contains at least one of the above mentioned metal chloride is then added to a solution which had been previously prepared by dissolving $NaHSO_4$, $NH_4HSO_4$ and $CuCl_2$ in distilled water. This causes the silica gel granules to further absorb these bisulfates and cupric chloride.

The mixture is then dried by keeping it under occasional stirring at 200° C. for 2 hours.

In carrying out the above process of preparation, the molar ratio of $NaHSO_4:NH_4HSO_4:CuCl_2$ and that of $CuCl_2$ to the sum of Ce, La and Th are adjusted to 1:1:0.2–20 and 10:0.1–1, respectively, while the content of $CuCl_2$ in the final product is so maintained as to have a concentration of 5.4 g. of $CuCl_2$ per 100 cc. of silica gel granules.

Even when a simple or multiple salt consisting of one member or two or three members of $KHSO_4$, $NaHSO_4$ and $NH_4HSO_4$ is employed instead of the equimolar composition of double salt consisting as in Examples 1 and 2 of $NaHSO_4$ and $NH_4HSO_4$, the molor ratio of the sum of bisulfates to copper (II) chloride should be adjusted to 1:0.1–10.

PROCESS OF OXYCHLORINATION

*Example 3*

In Table 1, there is presented the results obtained in oxychlorinating ethylene in the presence of a catalyst composition prepared according to the present invention. For the sake of comparison with the known types of catalyst systems, the results obtained under the same conditions of reaction with $CuCl_2$ alone and with a $CuCl_2–KCl$ catalyst system are also shown in the table.

TABLE 1

|  | Catalyst system [1] | | |
|---|---|---|---|
|  | I | II | III |
| Composition of Catalyst: | | | |
| CuCl$_2$ (g.) | 48.6 | 48.6 | 48.6 |
| NaHSO$_4$ (g.) | 65.0 | | |
| NH$_4$HSO$_4$ (g.) | 62.0 | | |
| KCl (g.) | | 45.0 | |
| SiO$_2$-gel (cc.) | 900 | 900 | 900 |
| Reaction temperature (°C.) | 200 | 200 | 200 |
| Amount of reactant gas supplied: | | | |
| C$_2$H$_4$ (cc./min.) | 450 | 450 | 450 |
| HCl (cc./min.) | 300 | 300 | 300 |
| O$_2$ (cc./min.) | 150 | 150 | 150 |
| Amount of chlorinated ethylene produced (g./hr.) | 37.5 | 30.0 | 10.3 |
| Conversion of HCl (percent) | 98.7 | 79.3 | 28.6 |
| Loss of catalyst due to volatilization (g./hr.) | Zero | 0.5 | 1.1 |
| Composition of reaction product obtained: | | | |
| 1,2-dichloroethane (percent) | 97.60 | 97.00 | 24.20 |
| Ethylchloride (percent) | 1.69 | 2.80 | 74.30 |
| Vinylchloride (percent) | 0.65 | 0.06 | 0.65 |
| Balance (percent) | 0.06 | 0.14 | 0.85 |

[1] Catalyst system I=CuCl$_2$-NaHSO$_4$-NH$_4$HSO$_4$ (the present invention). Catalyst system II=CuCl$_2$-KCl (for comparison). Catalyst system III=CuCl$_2$ alone (for comparison).

The runs of oxychlorination in this example were respectively carried out by means of a heat exchanger type of reaction tube made of 18 Cr–8 Ni stainless steel and equipped in the middle part thereof with a pipe for preheating the feed gas, the reaction tube itself being previously charged with 900 cc. of the above-mentioned catalyst.

The reaction temperature is automatically maintained at a fixed level by a set of electric thermocontrollers, which detect temperature of the inside of catalyst layers at two points and which operate electric heaters set around the reaction tube.

As seen from Table 1, the catalyst composition of the present invention is not only of far greater activity than the known types of catalysts, but also assured to be perfectly free from loss of catalyst through its volatilization.

*Example 4*

To further confirm the superiority of the high activity at the low temperature of the catalyst composition of the present invention, another run of experiment was carried out under the same conditions as in Example 3 but using a reaction temperature of 150° C. in the present example, the results are shown in Table 2.

TABLE 2

|  | Catalyst system [1] | |
|---|---|---|
|  | I | II |
| Amount of chlorinated ethylene produced (g./hr.) | 25.1 | 11.6 |
| Conversion of HCl (percent) | 65.8 | 30.5 |
| Catalyst loss due to volatilization (g./hr.) | Zero | Zero |
| Composition of reaction product obtained: | | |
| 1,2-dichloroethane (percent) | 99.50 | 98.50 |
| Ethylchloride (percent) | 0.65 | 1.16 |
| Vinylchloride (percent) | Zero | Zero |
| Balance (percent) | 0.35 | 0.34 |

[1] Catalyst system I=CuCl$_2$-NaHSO$_4$-NH$_4$HSO$_4$ (the present invention). Catalyst system II=CuCl$_2$-KCl (for comparison).

*Example 5*

The results obtained in oxychlorinating propylene at 200° C. in the presence of the same catalyst composition as in Examples 1 and 2 are shown in Table 3.

The flow rates of reactant gas were 300 cc./min. for C$_3$H$_6$, 200 cc./min. for HCl and 100 cc./min. for O$_2$, respectively.

TABLE 3

| Yield of reaction product | g./hr. | 16.0 |
|---|---|---|
| Composition of reaction product obtained: | | |
| Isopropylchloride | percent | 27.7 |
| 1,2-dichloropropane | do | 38.0 |
| Allyl chloride | do | 30.1 |
| Balance | do | 4.2 |

*Example 6*

This example will confirm the already mentioned fact that the higher activity of the catalyst composition described in this invention can be further improved by the addition of thorium chloride, cerium chloride or lanthanum chloride thereto so that high conversion is obtainable in the higher range of space velocity.

Table 4 shows the relation between the space velocity and the conversion for the cases in which the process of oxychlorination was carried out under such conditions, i.e., molar ratio of NaHSO$_4$:NH$_4$HSO$_4$:CuCl$_2$:chloride of Th, or Ce and or La is 1:1:2:0.2, reaction temperature is 200° C. and molar ratio of C$_2$H$_4$:HCl:O$_2$ is 3:2:1.

TABLE 4

|  | Space velocity | | | | |
|---|---|---|---|---|---|
|  | 400 | 600 | 800 | 1,000 | 1,200 |
| Catalyst system: | | | | | |
| NaHSO$_4$-NH$_4$HSO$_4$-CuCl$_2$ | 99.7 | 90.8 | 77.6 | 41.5 | |
| NaHSO$_4$-NH$_4$HSO$_4$-CuCl$_2$+ThCl$_4$ | 99.5 | 99.0 | 98.0 | 98.0 | 95.0 |
| NaHSO$_4$-NH$_4$HSO$_4$-CuCl$_2$+LaCl$_3$ | 99.5 | 99.0 | 98.0 | 97.5 | 80.0 |
| NaHSO$_4$-NH$_4$HSO$_4$-CuCl$_2$+CeCl$_3$ | 99.3 | 98.5 | 95.0 | 91.2 | 75.5 |

The space velocity and the conversion of HCl were defined in accordance with the following equations, respectively.

$$\text{Space velocity} = \frac{[F(C_2H_4) + F(HCl) + F(O_2)]}{[V]} \quad (1/\text{hr.})$$

Conversion of HCl =

$$\frac{[2M(EDC) + M(VC) + M(EC)]}{[M(HCl)]} \times 100(\%)$$

In which

F(C$_2$H$_4$) = Velocity of feeding of C$_2$H$_4$ (1/hr.)
F(HCl) = Velocity of feeding HCl (1/hr.)
F(O$_2$) = Velocity of feeding O$_2$ (1/hr.)
V = Volume of the catalyst composition employed (1)
M(EDC) = Amount of 1,2 - dichloroethane produced (mole/hr.)
M(EC) = Amount of ethylchloride produced (mole/hr.)
M(VC) = Amount of vinylchloride produced (mole/hr.)
M(HCl) = Amount of hydrogen chloride supplied (mole/hr.)

What we claim is:

1. A catalyst composition consisting essentially of an inert porous catalyst carrier having absorbed thereon a mixture of (1) cupric chloride and (2) a member selected from the group consisting of alkali metal bisulfate, ammonium bisulfate, and mixtures thereof, the molar ratio of component 2 to component 1 being 1:0.1 to 10.

2. A catalyst composition consisting essentially of an inert porous catalyst carrier having absorbed thereon a mixture of (1) cupric chloride, (2) a member selected from the group consisting of alkali metal bisulfate, ammonium bisulfate, and mixtures thereof, and (3) a member selected from the group consisting of lanthanum chloride, cerium chloride, thorium chloride, and mixtures thereof, the molar ratio of component 2 to component 1 being 1:0.1 to 10 and the molar ratio of component 1 to component 3 being 10:0.1 to 1.0.

References Cited

UNITED STATES PATENTS

| | | | |
|---|---|---|---|
| 3,210,158 | 10/1965 | Engel | 252—441 X |
| 3,210,431 | 10/1965 | Engel | 252—441 |
| 3,232,955 | 2/1966 | Nonnenmacher et al. | 252—435 X |

FOREIGN PATENTS

| | | |
|---|---|---|
| 505 | 1873 | Great Britain. |
| 907,435 | 10/1962 | Great Britain. |
| 932,130 | 7/1963 | Great Britain. |

OSCAR R. VERTIZ, *Primary Examiner.*

MAURICE A. BRINDISI, *Examiner.*

R. M. DAVIDSON, A. J. GREIF, *Assistant Examiners.*